United States Patent
Kubo et al.

(10) Patent No.: US 8,693,864 B2
(45) Date of Patent: Apr. 8, 2014

(54) OPTICAL NETWORK SYSTEM, OPTICAL REDUNDANT SWITCHING APPARATUS, AND WDM APPARATUS

(75) Inventors: Kazuo Kubo, Tokyo (JP); Takashi Mizuochi, Tokyo (JP); Yuji Akiyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 529 days.

(21) Appl. No.: 13/060,332

(22) PCT Filed: Oct. 15, 2008

(86) PCT No.: PCT/JP2008/068674
§ 371 (c)(1),
(2), (4) Date: Feb. 23, 2011

(87) PCT Pub. No.: WO2010/044154
PCT Pub. Date: Apr. 22, 2010

(65) Prior Publication Data
US 2011/0158648 A1   Jun. 30, 2011

(51) Int. Cl.
*H04J 14/02* (2006.01)
(52) U.S. Cl.
USPC .............................................. 398/7
(58) Field of Classification Search
USPC .............................................. 398/7
See application file for complete search history.

(56) References Cited

U.S. PATENT DOCUMENTS

| 5,299,293 | A | * | 3/1994 | Mestdagh et al. | 398/24 |
| 5,777,761 | A | * | 7/1998 | Fee | 398/7 |
| 6,081,359 | A | * | 6/2000 | Takehana et al. | 398/1 |
| 6,915,075 | B1 | * | 7/2005 | Oberg et al. | 398/9 |
| 7,233,738 | B2 | * | 6/2007 | Kerfoot, III | 398/10 |

FOREIGN PATENT DOCUMENTS

| EP | 877 502 | 11/1998 |
| JP | 10 210008 | 8/1998 |
| JP | 2000 115132 | 4/2000 |
| JP | 2000 332655 | 11/2000 |

(Continued)

OTHER PUBLICATIONS

International Search Report issued Dec. 22, 2008 in PCT/JP08/68674 filed Oct. 15, 2008.
Series G: Transmission Systems and Media, Digital Systems and Networks, Digital terminal equipments—General Series Y: Global Information Infrastructure, Internet Protocol Aspects and Next Generation Networks, Internet protocol aspects—Transport, International Telecommunication Union, ITU-T G 709/Y 1331, (Mar. 2003).

(Continued)

*Primary Examiner* — Leslie Pascal
(74) *Attorney, Agent, or Firm* — Oblon, Spivak, McClelland, Maier & Neustadt, L.L.P.

(57) ABSTRACT

An optical network system includes a first node that converts input signals of n systems into optical signals having wavelengths different for each of the systems and wavelength-multiplexes and transmits the optical signals and a second node that selects signals of n systems from the wavelength-multiplexed signals and outputs the signals. The first node includes an optical coupler that divides the input signals into operating system signals and redundant signals, TPNDs that convert the operating systems into optical signals, an optical switch that selects standby system signals from the redundant signals, and a TPND that converts the standby system signals into optical signals in a storage mode corresponding to a type of the standby system signals. The second node includes TPNDs that convert the optical signals converted from the operating system signals into signals of a type corresponding to the input signals, a TPND that converts the optical signals of the standby system signals into signals of the type of the input signals in a storage mode corresponding to the standby system signals, and an optical switch that selects an output destination of the signals output from the TPND.

8 Claims, 6 Drawing Sheets

(56) References Cited

FOREIGN PATENT DOCUMENTS

| | | |
|---|---|---|
| JP | 2003-224872 A | 8/2003 |
| JP | 2003 324759 | 11/2003 |
| JP | 2004-064585 A | 2/2004 |
| JP | 2005-12306 | 1/2005 |
| JP | 2005-508106 A | 3/2005 |
| JP | 2005-531950 | 10/2005 |
| JP | 2006-287419 | 10/2006 |
| JP | 2008 177773 | 7/2008 |
| JP | 2008 227792 | 9/2008 |

OTHER PUBLICATIONS

Office Action issued Feb. 7, 2012, in Japanese Patent Application No. 2010-533753 with partial English translation.
Japanese Office Action issued Oct. 9, 2012 in Patent Application No. 2010-533753 with English Translation.
U.S. Appl. No. 13/421,327, filed Mar. 15, 2012, Akiyama, et al.
Supplementary European Search Report issued in corresponding application No. EP 08 87 7412, mailed Nov. 12, 2013.

* cited by examiner

FIG.6

| 1 | | | | | | | | 2 | | | | | | | | 3 | | | | | | | | 4 | | | | | | | |
|---|---|---|---|---|---|---|---|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 | 1 | 2 | 3 | 4 | 5 | 6 | 7 | 8 |
| REQUEST/ STATE | | | | PROTECTION TYPE | | | | REQUESTED SIGNAL | | | | | | | | BRIDGED SIGNAL | | | | | | | | RESERVED | | | | | | | |
| | | | | A | B | D | R | | | | | | | | | | | | | | | | | | | | | | | | |

OPTICAL NETWORK SYSTEM, OPTICAL REDUNDANT SWITCHING APPARATUS, AND WDM APPARATUS

TECHNICAL FIELD

The present invention relates to an optical network system, an optical redundant switching apparatus, and a WDM apparatus that perform switching of a redundant system and an operating system in an optical network including the redundant system.

BACKGROUND ART

As an example of an optical redundant switching method in the past in an optical network system, for example, there is a technology disclosed in Patent Document 1 described below. An optical redundant switching apparatus disclosed in Patent Document 1 includes an optical coupler that divides signals of n channels received from an external apparatus to two directions for operating system signals and signals transmitted in the direction of an optical switch, respectively, and the optical switch that selects the signals in the direction of the optical switch divided by the optical coupler and outputs the signals as standby system signals. The optical redundant switching apparatus transmits the operating system signals to an operating system optical terminal station apparatus. The standby system signals selected by the optical switch are output to a standby system optical terminal station apparatus.

The operating system optical terminal station apparatus converts the input operating system signals into wavelengths λ1 to λn, which are different for each of channels, and outputs the operating system signals to a wavelength multiplexing apparatus. The standby system optical terminal station apparatus converts the standby system signals into a wavelength λ(n+1) and outputs the standby system signals to the wavelength multiplexing apparatus. The wavelength multiplexing apparatus multiplexes the wavelengths λ1 to λ(n+1) and transmits a wavelength-multiplexed signal to a wavelength multiplexing apparatus on a reception side opposed thereto. The wavelength multiplexing apparatus on the reception side separates the wavelength-multiplexed signal into the wavelengths λ1 to λ(n+1) and outputs, for each of the wavelengths λ1 to λ(n+1), the wavelength-multiplexed signal to an operating system optical terminal station apparatus and a standby system optical terminal station apparatus on the reception side. The operating system optical terminal station apparatus and the standby system optical terminal station apparatus on the reception side convert the wavelengths λ1 to λ(n+1) into operating system signals and standby system signals for each of the channels in a manner opposite to the that during the transmission and output the operating system signals and the standby system signals to an optical redundant switching apparatus on the reception side. When the signals of the channels are normal, the optical redundant switching apparatus outputs the operating system signals to an external apparatus by performing processing in a direction opposite to that during the transmission and discards the standby system signals.

In this optical redundant switching system, at the ordinary time, the transmission and reception of the operating system signals is performed between the external apparatus on the transmission side and the external apparatus on the reception side according to the procedure explained above. For example, when some failure occurs in an optical transmission line corresponding to λ2, an optical switch of the optical redundant switching apparatus on the transmission side selects an operating system signal of a second channel transmitted as λ2 after conversion and outputs the operating system signal as a standby system signal. The standby system signal is input to the optical redundant switching apparatus on the reception side through the standby system optical terminal station apparatus and the wavelength multiplexing apparatus and through the wavelength multiplexing apparatus and the standby system optical terminal station apparatus on the reception side opposed thereto. An optical switch of the optical redundant switching apparatus on the reception side selects this standby system signal to correspond to the operating system signal output of the second channel and outputs the standby system signal to the external apparatus.

In this way, in the example in the past, an n:1 optical redundant switching system is configured by adopting a method of remedying, when a failure occurs in any one of apparatuses or optical transmission lines corresponding to the signals of the n channels, an optical signal by switching to transfer a signal corresponding the transmission line, in which the failure occurs, via the standby wavelength (λ(n+1)) of the standby system.

Patent Document 1: Japanese Patent Application Laid-Open No. 2000-332655

DISCLOSURE OF INVENTION

Problem to be Solved by the Invention

However, according to the technology in the past explained above, a configuration for remedying the signals of the n channels with one standby system is adopted. Therefore, all the signals of the n channels need to be signals of the same type. There is a problem in that, for example, when an STM-64 (Synchronous Transport Module-64) signal and a 10 GbE LAN (10 Gigabit Ethernet (registered trademark) Local Area Network) signal having different transmission rates are mixed, the n:1 optical redundant switching system cannot be provided.

The present invention has been devised in view of the above and it is an object of the present invention to obtain an optical network system, an optical redundant switching apparatus, and a WDM apparatus that can take measures even when signals having different transmission rates, frame formats, and the like are mixed.

Means for Solving Problem

In order to solve the above problem and in order to attain the above object, an optical network system of the present invention including: a first optical redundant switching apparatus that generates standby system signals of M (M is a natural number equal to or larger than N) systems with respect to input signals of N (N is a natural number) systems and converts the input signals and the standby system signals into optical signals having wavelengths different for each of M+N kinds of systems; a first WDM apparatus that wavelength-multiplexes the converted signals and transmits a wavelength-multiplexed signal to an optical transmission line; a second WDM apparatus that wavelength-separates the wavelength-multiplexed signal input from the optical transmission line; and a second optical redundant switching apparatus that selects signals of the N systems from wavelength-separated signals and outputs the signals, wherein the input signals include at least two kinds of signals in system unit, the first optical redundant switching apparatus, includes: an optical coupler that divides, for each of the systems of the input signals, the input signals into two systems of operating system signals and redundant signals; a transmission-side operating system transponder that converts the operating system signals into optical signals having wavelengths different for each of the systems of the input signals; a transmission-side optical switch that selects signals of M systems from the redundant signals as the standby system signals; and a transmission-side standby system transponder that has storage modes for performing kinds of processing respectively corresponding to types of the input signals and converts, in the storage mode corresponding to a type of the standby system signals, the standby system signals into optical signals having wavelengths different from the wavelengths of the optical signals used for the conversion of the operating system signals and different for each of the systems, the second optical redundant switching apparatus, includes: a reception-side operating system transponder that converts, for each of the systems, the optical signals having the wavelengths converted from the operating system signals among the wavelength-separated signals into signals of types corresponding to the input signals; a reception-side standby system transponder that has storage modes for performing kinds of processing respectively corresponding to the types of the input signals and converts, in the storage mode corresponding to the type of the standby system signals, optical signals having wavelengths converted from the standby system signals among the wavelength-separated signals into signals of the type of the standby system signals for each of the systems; reception-side 2:1 optical switches that are provided for each of the types of the input signals and select an output from the reception-side standby system transponder or an output from the reception-side operating system transponder and output the output; and a reception-side optical switch that selects, as an output destination of a signal output from the reception-side standby system transponder, the reception-side 2:1 optical switch corresponding to a system selected by the transmission-side optical switch and outputs the signal output from the reception-side standby system transponder to the selected reception-side 2:1 optical switch, and the reception-side 2:1 optical switch corresponding to the system selected by the transmission-side optical switch selects a signal output from the reception-side standby system transponder and outputs the signal, and the other reception-side 2:1 optical switches select a signal output from the reception-side operating system transponder and output the signal.

Effect of the Invention

According to the present invention, an optical redundant switching apparatus includes, as a standby system transponder, a multi-rate transponder that enables processing corresponding to a plurality of kinds of signals, which are likely to be transmitted, and can switch these kinds of processing according to setting. When a failure is detected, the optical redundant switching apparatus notifies an apparatus opposed thereto of a storage mode corresponding to a type of a signal in which the failure occurs. Therefore, there is an effect that it is possible to take measures even when signals having different transmission rates, frame formats, and the like are mixed.

BRIEF DESCRIPTION OF DRAWINGS

FIG. 6 is a diagram of an APS byte of ODU2 OH indicated by ITU-T G.709.

Figure 1:
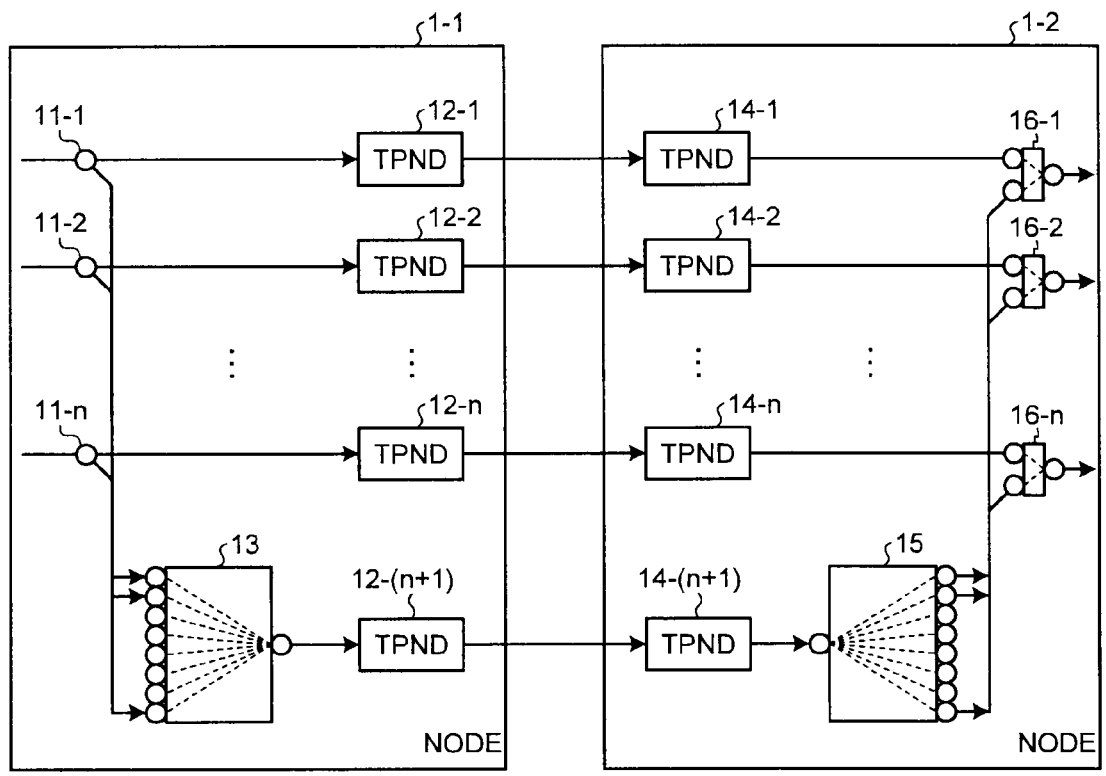
FIG. 1 is a diagram of a functional configuration example of a first embodiment of an optical redundant switching apparatus according to the present invention.

EXPLANATIONS OF LETTERS OR NUMERALS 1-1, 1-2 nodes
11-1 to 11-$n$ optical couplers
12-1 to 12-$n$, 14-1 to 14-$n$ TPNDs
13, 15, 16-1 to 16-$n$ optical switches
21 XFP
22 16 bit SerDes
23 OTN framer
24 STM-64 10 GbE monitor
25 OPU2 mapper
26 OTU2 ODU2 processor
27 FEC Encoder
28 FEC Decoder
29, 31 PLLs
30 10 G WDM transceiver

BEST MODE(S) FOR CARRYING OUT THE INVENTION

Embodiments of an optical network system, an optical redundant switching apparatus, and a WDM apparatus according to the present invention are explained in detail below with reference to the drawings. The present invention is not limited by the embodiments.

First Embodiment

FIG. 1 is a diagram of a functional configuration of a first embodiment of an optical network system including optical redundant switching apparatuses according to the present invention. In FIG. 1, it is assumed that an optical redundant switching apparatus on a transmission side of a signal is included in a node 1-1, which is a communication apparatus such as a WDM apparatus, and an optical redundant switching apparatus on a reception side is included in a node 1-2, which is a communication apparatus such as a WDM apparatus. In FIG. 1, only components of the optical redundant switching apparatuses are shown and sections that perform processing such as wavelength multiplexing and amplification are omitted.

The node 1-1 includes optical couplers 11-1 to 11-$n$ that divide, for each of channels, signals for n channels received from a not-shown external apparatus to two directions for an operating system and a standby system, respectively, transponders (TPNDs) 12-1 to 12-$n$ that convert the signals for the operating system divided by the optical couplers 11-1 to 11-$n$ into optical signals of $\lambda_1$ to $\lambda_n$ and send the optical signals of $\lambda_1$ to $\lambda_n$, an optical switch 13 that selects a standby system signal from the signals for the standby system divided by the optical couplers 11-1 to 11-$n$ and sends the standby system signal, and a TPND 12-$(n+1)$ that converts the standby system signal sent from the optical switch 13 into an optical signal of $\lambda_{n+1}$ and sends the optical signal of $\lambda_{n+1}$.

The optical signals having the wavelengths $\lambda_1$ to $\lambda_{n+1}$ sent from the TPNDs 12-1 to 12-$(n+1)$ of the node 1-1 are subjected to predetermined processing such as wavelength multiplexing and amplification by not-shown components and sent to an optical transmission line. A wavelength-multiplexed signal sent to the optical transmission line is received by the node 1-2. The node 1-2 separates, with a not-shown component, the wavelength-multiplexed signal into signals for each of the wavelengths $\lambda_1$ to $\lambda_{n+1}$ and the separated signals are input to transponders 14-1 to 14-(n+1).

The node 1-2 includes the transponders 14-1 to 14-(n+1) that convert the separated optical signals of $\lambda_1$ to $\lambda_{n+1}$ into signals of types set for each of channels and send the signals, an optical switch 15 that receives a standby system signal from the transponder 14-(n+1) and outputs the standby system signal to a selected output destination, and optical switches 16-1 to 16-n as 2:1 optical switches that output, for each of the channels, any one of operating system signals output from the transponders 14-1 to 14-n and the standby system signal of the transponder 14-(n+1) to the external apparatus. It is assumed that kinds of processing corresponding to first to nth channels are performed by components respectively having branch numbers of the same numbers (e.g., concerning the first channel, the optical coupler 11-1, optical switch 16-1, and the TPNDs 12-1 and 14-1 perform processing).

In FIG. 1, the node 1-1 performs the processing on the transmission side and the node 1-2 performs the processing on the reception side. However, as generally performed, each of the nodes 1-1 and 1-2 can have both the functions on the transmission side and the reception side.

In this case, the nodes 1-1 and 1-2 can include the TPNDs 12-i (i=1 to (n+1)) and 14-i shown in FIG. 1 as separate components, respectively. However, it is assumed that the nodes 1-1 and 1-2 have both a function of the TPNDs 12-i and a function of the TPNDs 14-i.

In this embodiment, it is assumed that a 10 GbE LAN signal is stored in the second channel (hereinafter referred to as ch#2) and an STM-64 signal is stored in the other first and third to nth channels (hereinafter referred to as ch#1 and ch#3 to ch#n).

Figure 2:
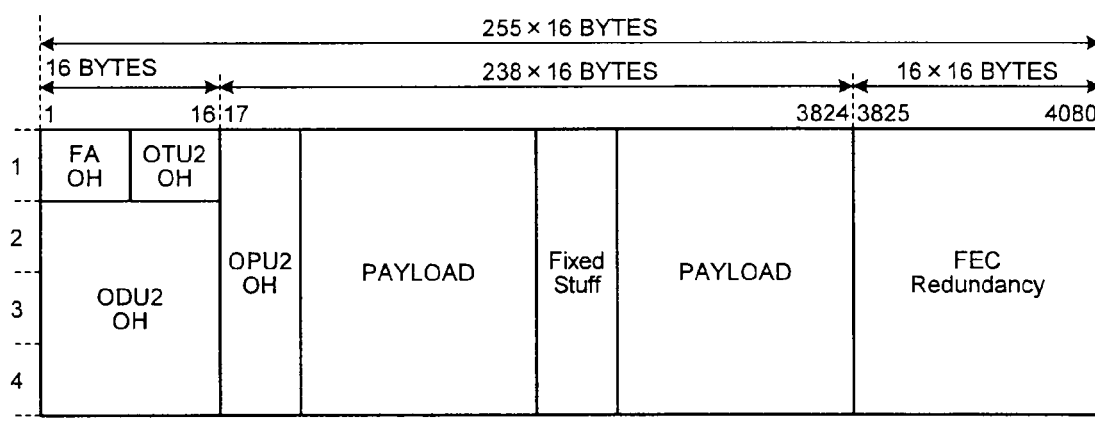
FIG. 2 is an example of a frame format used in transmission between TPNDs.

FIG. 2 is an example of a frame format used for transmission between the TPNDs 12-1 to 12-(n+1) of the node 1-1 and the TPNDs 14-1 to 14-(n+1) of the node 1-2. As an example, a frame format of an OTU2 (Optical Transport Unit 2) frame indicated by the ITU-T (International Telecommunication Union Telecommunication) G.709 recommendation of an OTN (Optical transport Network) is shown. The OTU2 frame includes an FA OH (Frame Alignment OverHead), an OTU2 OH, an ODU (Optical Data Unit) 2 OH, and an OPU (Optical channel Payload Unit) 2 OH as OHs (OverHeads) for providing frame synchronization and various monitoring control functions, a Fixed Stuff for fixedly adjusting a speed difference, FEC (Forward Error Correction) Redundancy for storing error correction code information, and a payload as information to be transmitted. An STM-64 signal, a 10 GbE LAN signal, and the like are transferred while being stored in the payload.

Figure 3:
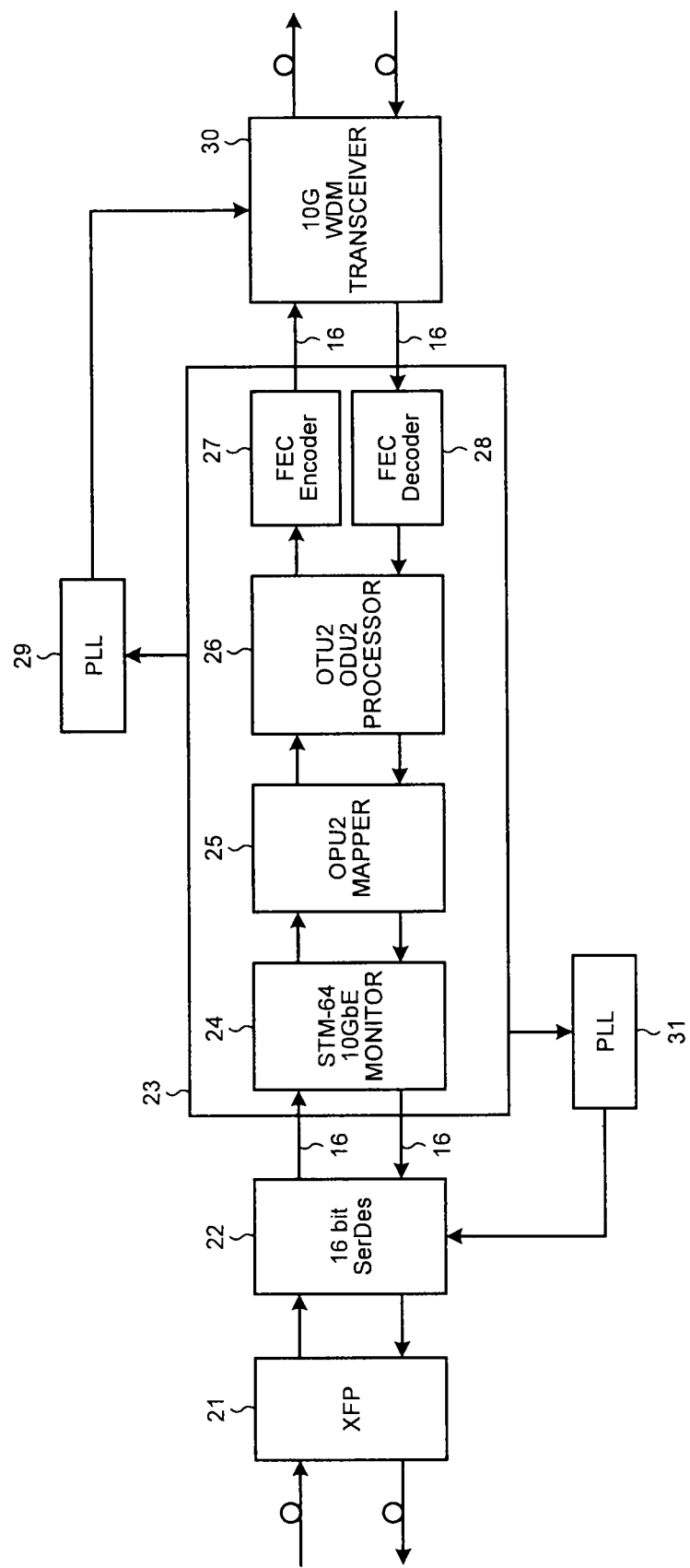
FIG. 3 is a diagram of a configuration example of a TPND.

FIG. 3 is a diagram of a configuration example of the TPNDs 12-1 to 122-(n+1) and 14-1 to 14-(n+1). As shown in FIG. 3, the TPND 12-1 to 122-(n+1) and 14-1 to 14-(n+1) include an XFP 21 specified as a 10 Gigabit Small Form Factor Pluggable Module that applies optical-to-electrical interconversion to the STM-64 signal and the 10 GbE LAN signal, a 16 bit SerDes 22 that performs serial-to-parallel interconversion between a serial electric signal output from the XFP 21 and a 16 parallel electric signal (SFI-4: Serdes-Framer Interface-4), an OTN framer 23 that performs frame processing for the OTU2 frame, a PLL (Phase Locked Loop) 29 that generates a clock for forming the OTU2 frame, a 10 G WDM transceiver 30 that performs serial-to-parallel interconversion of a 16 parallel input and output signal SFI-4 of the OTN framer 23, performs optical-to-electrical interconversion for a serial signal, and transmits and receives an OTN signal at predetermined optical wavelength, and a PLL 31 that generates a clock for demapping the STM-64 signal and the 10 GbE LAN signal from the OTU2 frame.

The OTN framer 23 includes an STM-64 10 GbE monitor 24 that monitors states of the STM-64 signal and the 10 GbE LAN signal, an OPU2 mapper 25 that performs generation and termination of the OPU2 OH and stores the STM-64 signal and the 10 GbE LAN signal, an OTU2 ODU2 processor 26 that performs generation and termination of the OTU2 OH and the ODU2 OH, an error correction encoding FEC Encoder 27, and an FEC Decoder 28 that performs error decoding.

In the example shown in FIG. 3, each of the TPNDs 12-1 to 122-(n+1) and 14-1 to 14-(n+1) has functions in both directions of the transmission side and the reception side. In FIG. 3, an upper side arrow indicates a flow of a signal of the TPND functioning as the transmission side and a lower side arrow indicates a flow of a signal of the TPND functioning as the reception side.

Operations of this embodiment are explained below. At the ordinary time (normal time), signals of ch#1 to ch#n are respectively input to the TPNDs 12-1 to 12-n through the optical couplers 11-1 to 11-n and stored in the OTU2 frame respectively by the TPNDs 12-1 to 12-n. At this point, the signals of ch#1 to ch#n are respectively converted into optical wavelengths of $\lambda 1$ to $\lambda n$ different from one another and input to the TPNDs 14-1 to 14-n of the node 1-2 as STM-64 over OTN or 10 GbE over OTN. In the following explanation, wavelength multiplexing processing before signals are transmitted to an optical transmission line, processing of wavelength separation after the signals are received from the optical transmission line, optical amplification processing, and the like are omitted.

The TPNDs 14-1 to 14-n demap the STM-64 signal or the 10 GbE LAN signal from the received OTU2 frame and respectively output the STM-64 signal or the 10 GbE LAN signal to the optical switches 16-1 to 16-n. The optical switches 16-1 to 16-n select the signals input from the TPNDs 14-1 to 14-n and outputs the signals to the external apparatus as the STM-64 signal or the 10 GbE LAN signal.

On the other hand, between the TPND 12-(n+1) and the TPND 14-(n+1), for example, an OTU frame is generated in an STM-64 mode (a processing mode in storing the STM-64 signal) and transmission and reception is performed. Normality of processing and transmission performed by using a wavelength $\lambda_{n+1}$ used as a standby system is monitored. Content of the payload at this point can be any data.

Figure 4:
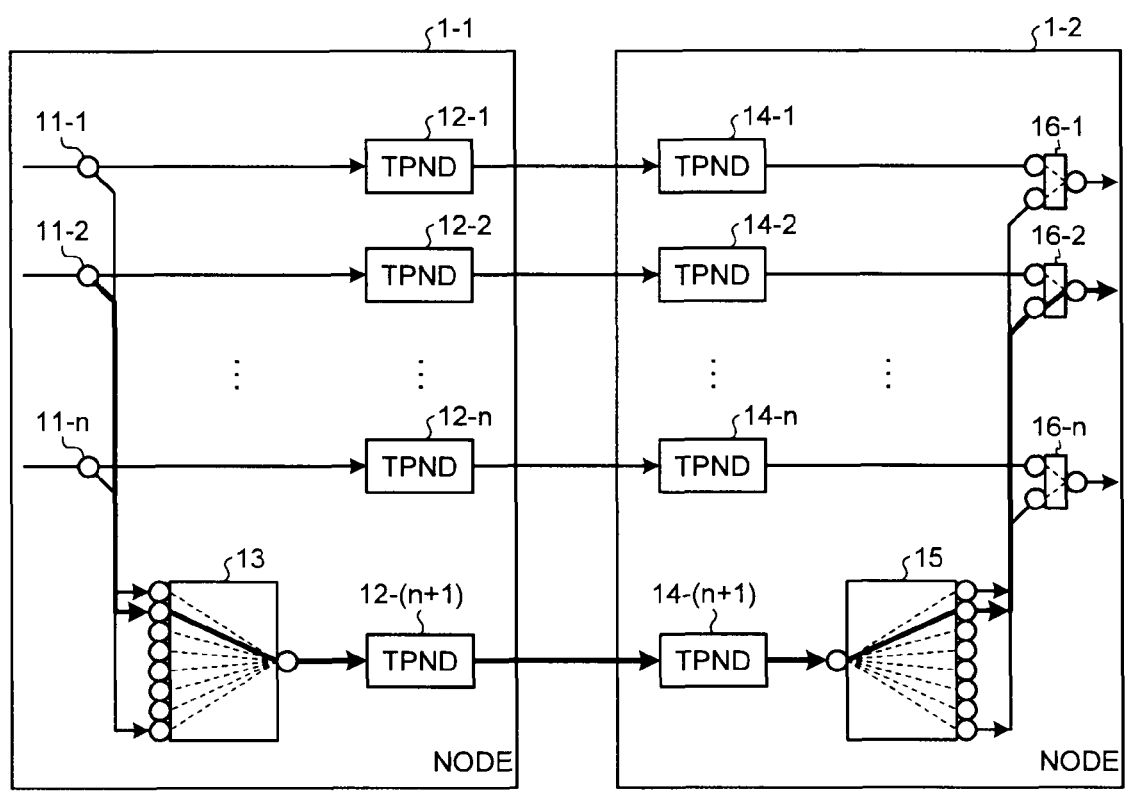
FIG. 4 is a diagram for explaining an operation performed when a failure occurs.

FIG. 4 is a diagram for explaining an operation performed when a failure occurs. As an example of occurrence of a failure, as shown in FIG. 4, it is assumed that some failure occurs on a path concerning $\lambda_2$ for storing the 10 GbE LAN signal. The failure on the path concerning $\lambda_2$ is detected by, for example, the TPND 14-2. The node 1-2 only has to notify the node 1-1 of the detection the failure. An apparatus or the like that manages the entire optical network including the node 1-1 and the node 1-2 can grasp the failure according to the notification from the node 1-2 and notify the node 1-1 of the failure.

When the failure is detected, the optical switch 13 selects the 10 GbE LAN signal output from the optical coupler 11-2 and outputs the 10 GbE LAN signal to the TPND 12-(n+1). The TPND 12-(n+1) shifts from the STM-64 mode at the ordinary time to a 10 GbE LAN mode (a mode for storing the 10 GbE LAN signal), performs processing same as the processing performed by the TPND 12-2, and generates the OTU2 frame. The generated OTU2 frame is transmitted to the node 1-2 as a standby system signal using $\lambda_{n+1}$.

The TPND 14-(n+1) shifts from the STM-64 mode at the ordinary time to the 10 GbE LAN mode and, in the same manner as the processing performed by the TPND 14-2, demaps the 10 GbE LAN signal from the OTU2 frame transmitted as the standby system signal using $\lambda_{n+1}$ and outputs the 10 GbE LAN signal to the optical switch 15. The optical switch 15 outputs the input 10 GbE LAN signal to the optical switch 16-2. The optical switch 16-2 selects the signal input from the optical switch 15 and outputs the signal to the external apparatus as the 10 GbE LAN signal of ch#2.

The STM-64 signal and the 10 GbE LAN signal respectively have different transmission rates of 9.95328 Gbit/s and 10.3125 Gbit/s and also have different frame structures. Therefore, each of the TPND 12-(n+1) and the TPND 14-(n+1) has two modes for dealing with the respective signals. For example, in the example shown in FIG. 4, the TPND 12-(n+1) and the TPND 14-(n+1) shift from the STM-64 mode to the 10 GbE LAN mode. This can be realized by, for example, making it possible to switch processing of the OTN framer 23 to processing corresponding to the STM-64 and processing corresponding to the 10 GbE LAN signal according to setting, making it possible to change working speeds of the XFP 21, the 16 bit SerDes 22, the OTN framer 23, the 10 G WDM transceiver 30, and the PLLs 29 and 31, and changing the working speeds according to the modes.

Figure 5:
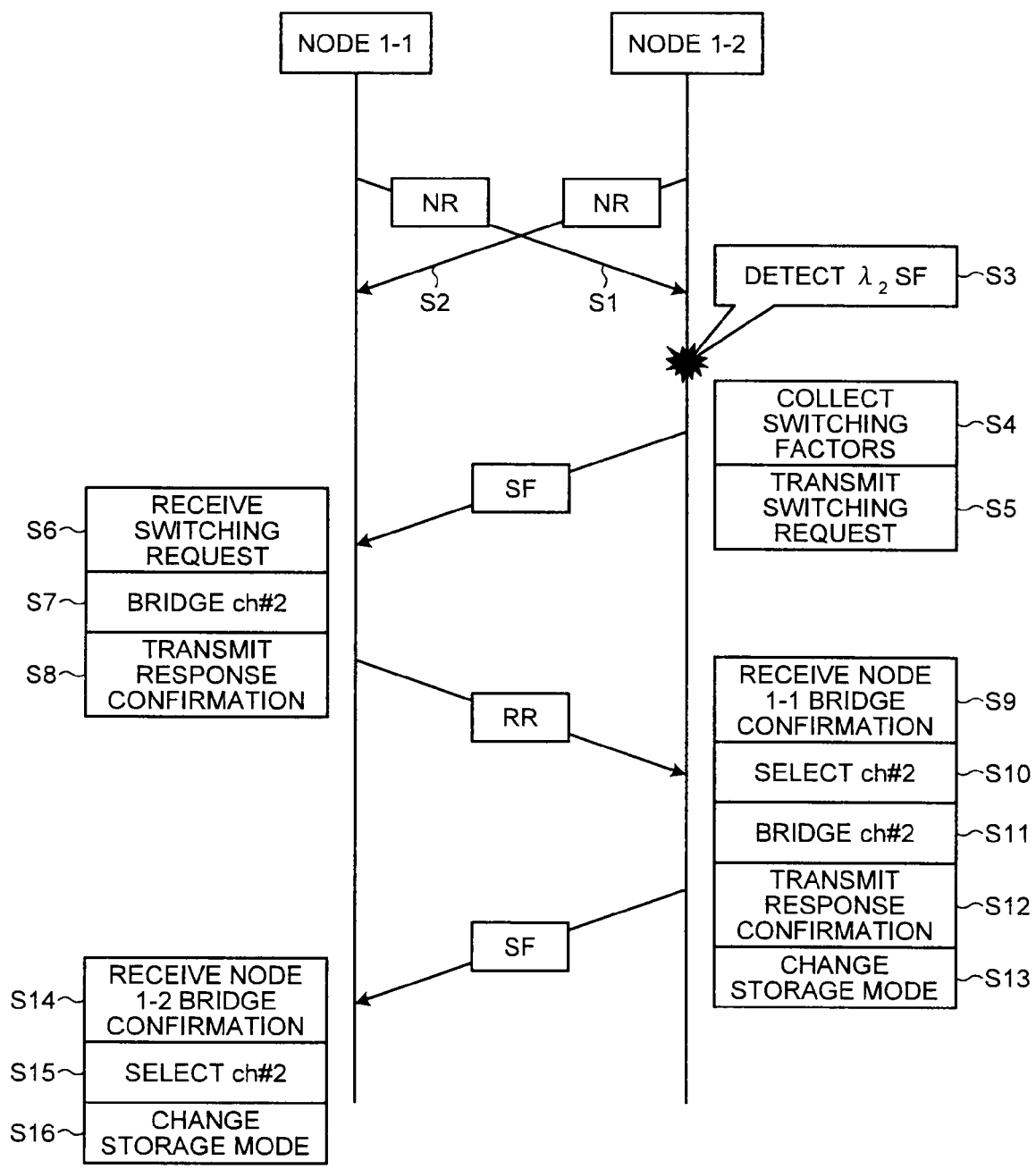
FIG. 5 is a sequence chart of an example of a processing procedure of an optical redundant switching method according to the first embodiment.

FIG. 5 is a sequence chart of an example of a processing procedure of an optical redundant switching method according to this embodiment. The optical redundant switching method according to this embodiment is explained with reference to FIG. 5. As in the example shown in FIG. 4, as an example, a failure occurs in the path concerning $\lambda_2$. It is assumed that transmission and reception is performed between the node 1-1 and the node 1-2 and both the node 1-1 and the node 1-2 have functions of the transmission side and the reception side.

First, at the ordinary time, the node 1-1 and the node 1-2 transmit NR (No Request), which indicates that a switching request is not generated, to each other (step S1 and step S2). When a failure occurs in the path concerning $\lambda_2$ the node 1-2 detects an SF (Signal Fail) (step S3).

The node 1-2 collects switching factors (e.g., a number of wavelength as switching target) as information necessary for transmission of a switching request, which is a request for switching to a standby system (step S4). The node 1-2 transmits a switching request (SF) to the node 1-1, which is a transmission source of a signal of $\lambda_2$ in which the failure is detected (step S5).

The node 1-1 receives the switching request (step S6) and bridges ch#2 (step S7). Specifically, the node 1-1 sets the optical switch 13 such that a signal is output to the TPND 12-(n+1), which is a standby system TPND (step S7). The node 1-1 transmits, to the node 1-2, a response confirmation (RR) indicating that the bridging of the node 1-1 (switching to a standby system of ch#2) is completed (step S8).

The node 1-2 receives the response confirmation from the node 1-1 to thereby confirm the completion of the bridging of the node 1-1 (step S9). The node 1-2 sets the optical switch 15 to output, to the optical switch 16-2, a signal input from the TPND 14-(n+1), which is a transponder of a standby system, and sets the optical switch 16-2 to select the signal input from the optical switch 15 and output the signal to the external apparatus (step S10: ch#2 select). The node 1-2 sets, for transmission in the opposite direction (a transmitting direction from the node 1-2 to the node 1-1), the optical switch 15 such that ch#2 is output from the standby system (ch#2 bridge: step S11) and transmits a response confirmation (step S12) and changes the TPND 14-(n+1) of the standby system from the STM-64 mode to the 10 GbE LAN mode (step S13).

The node 1-1 receives the response confirmation transmitted at step S12 to thereby confirm the completion of the bridging of the node 1-2 (step S14). For reception of data transmitted from the node 1-1, the node 1-1 sets the optical switch 13 to output a signal received by the TPND 22-(n+1) to the external apparatus as a signal of ch#2 (step S15: ch#2 select) and changes the TPND 122-(n+1) of the standby system from the STM-64 to the 10 GbE LAN mode (step S16).

For the exchange of the information concerning the mode switching between the nodes explained above, for example, the ODU2 OH of the OTN frame can be used. FIG. 6 is a diagram of an APS (Automatic Protection Switching) byte of the ODU2 OH indicated by the ITU-T G.709. A switching factor/a request state such as SF is stored in a section of Request/state of this APS byte, a switching type (information concerning, for example, whether switching is switching of n:1 or switching of 1+1) is stored in a section of Protection type, a switching request wavelength number is stored in Requested Signal, and a wavelength number bridged on the transmission side is stored in a section of Bridged Signal and notified. This makes it possible to perform switching control between the nodes.

Information concerning to which storage mode (e.g., the STM-64 mode or the 10 GbE LAN mode) the mode for storing a signal is changed can be notified using a Reserved region of the APS byte shown in FIG. 6.

It is likely that, when the storage mode is switched, a failure is transitionally detected regardless of the fact that a failure does not occur in the standby system in a transmission line that uses standby system wavelength (in this case, $\lambda_{n+1}$). As measures against such a phenomenon, for example, when the storage mode is switched, it is sufficient to, for a predetermined time, continue operation even if a failure in the transmission line of the standby system wavelength is detected and not to perform failure-time processing.

In the example explained in this embodiment, the optical redundant switching apparatuses are included in the communication apparatus such as the WDM apparatus. However, the wavelength multiplexing, the separation, and the like can be performed in separate apparatuses and the optical redundant switching apparatuses can be configured as independent hardware.

In this way, in this embodiment, the optical redundant switching apparatus includes, as the standby system transponder, the transponder (a multi-rate transponder) that enables processing corresponding to a plurality of kinds of signals, which are likely to be transmitted, and can switch these kinds of processing according to setting. The storage mode corresponding to a type of a signal is notified using the APS byte. Therefore, even in a system in which signals of different signal types are mixed, it is possible to provide an n:1 optical redundant switching apparatus and an n:1 optical redundant switching system.

In this embodiment, the example of the n:1 optical redundant switching system is explained. However, in an N:M optical redundant switching system, effects same as those in this embodiment can be realized by designating storage modes for a signal to be switched in the same manner as this embodiment.

In this embodiment, the example of the processing performed when the STM-64 signal and the 10 GbE LAN signal are mixed is explained. However, when signals of types other than these signals (e.g., an STM-16 signal and a gigabit Ethernet (registered trademark) signal) are mixed or when three or more types of signals are mixed, effects same as those in this embodiment can be obtained by notifying the storage modes in the same manner as this embodiment using, as a standby system transponder, a multimode transponder that can store processing corresponding to the respective types of the signals.

Second Embodiment

Figure 7:
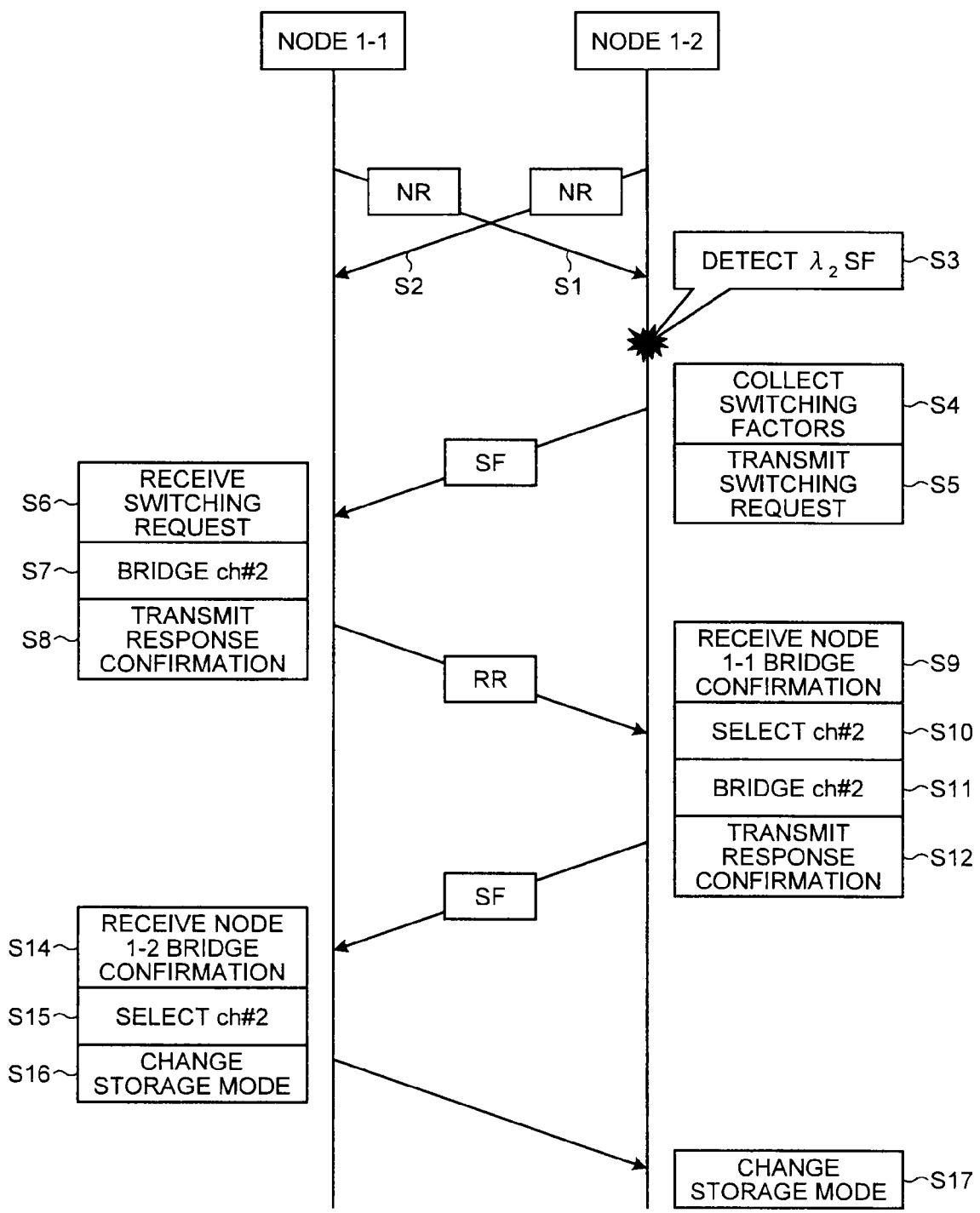
FIG. 7 is a sequence chart of an example of a processing procedure of an optical redundant switching method according to a second embodiment.

FIG. 7 is a sequence chart of an example of a processing procedure of an optical redundant switching method according to a second embodiment of the present invention. The configurations of an optical redundant switching apparatus and an optical redundant switching system according to this embodiment are the same as those in the first embodiment. Components different from those in the first embodiment are explained below.

In FIG. 7, steps for performing kinds of processing same as those in the first embodiment are denoted by the same step numbers. In the first embodiment, the node 1-2 performs the switching of the storage mode at step S13 and the node 1-1 performs the switching of the storage mode at step S16. However, in the second embodiment, the node 1-2 proceeds to step S14 without performing the switching at step S13. As in the first embodiment, the node 1-1 performs the switching of the storage mode after step S15. After the node 1-1 notifies the node 1-2 of the switching of the storage mode, the node 1-2 switches the storage mode (step S17). Operations in this embodiment other than those explained above are the same as the operations in the first embodiment.

In this way, in this embodiment, the node 1-2 that detects a failure switches the storage mode after the node 1-1 opposed to the node 1-2 switches the storage mode. Therefore, it is possible to obtain effects same as those in the first embodiment. The node 1-2 can carry out switching of the node 1-2 after confirming the completion of the switching of the node 1-1.

INDUSTRIAL APPLICABILITY

As explained above, the optical network system, the optical redundant switching apparatus, and the WDM apparatus according to the present invention are useful for an optical network including a redundant system and, in particular, suitable for an optical network including signals of different types.

The invention claimed is:

1. An optical network system comprising:
a first optical redundant switching apparatus that generates standby system signals of M (M is a natural number equal to or larger than N) systems with respect to input signals of N (N is a natural number) systems, converts the input signals and the standby system signals into optical signals having wavelengths different for each of M+N kinds of systems and transmits the optical signals to an optical transmission line; and
a second optical redundant switching apparatus that selects signals of the N systems from the optical signals and outputs the signals, wherein
the input signals include at least two kinds of signals in system unit,
the first optical redundant switching apparatus includes:
an optical coupler that divides, for each of the systems of the input signals, the input signals into two systems of operating system signals and redundant signals;
a transmission-side operating system transponder that converts the operating system signals into optical signals having wavelengths different for each of the systems of the input signals;
a transmission-side optical switch that selects signals of M systems from the redundant signals as the standby system signals; and
a transmission-side standby system transponder that has storage modes for performing kinds of processing respectively corresponding to types of the input signals and converts, in the storage mode corresponding to a type of the standby system signals, the standby system signals into optical signals having wavelengths different from the wavelengths of the optical signals used for the conversion of the operating system signals and different for each of the systems,
the second optical redundant switching apparatus includes:
a reception-side operating system transponder that converts, for each of the systems, the optical signals having the wavelengths converted from the operating system signals among the optical signals having wavelengths different for each of M+N kinds of systems into signals of types corresponding to the input signals;
a reception-side standby system transponder that has storage modes for performing kinds of processing respectively corresponding to the types of the input signals and converts, in the storage mode corresponding to the type of the standby system signals, optical signals having wavelengths converted from the standby system signals among the optical signals having wavelengths different for each of M+N kinds of systems into signals of the type of the standby system signals for each of the systems;
reception-side 2:1 optical switches that are provided for each of the types of the input signals and select an output from the reception-side standby system transponder or an output from the reception-side operating system transponder and output the output; and
a reception-side optical switch that selects, as an output destination of a signal output from the reception-side standby system transponder, the reception-side 2:1 optical switch corresponding to a system selected by the transmission-side optical switch and outputs the signal output from the reception-side standby system transponder to the selected reception-side 2:1 optical switch, and
the reception-side 2:1 optical switch corresponding to the system selected by the transmission-side optical switch selects a signal output from the reception-side standby system transponder and outputs the signal, and the other reception-side 2:1 optical switches select a signal output from the reception-side operating system transponder and output the signal.

2. The optical network system according to claim 1, wherein a transmission frame used in the optical transmission line is a frame based on ITU-T G.709.

3. The optical network system according to claim 1, wherein
the second optical redundant switching apparatus performs switching notification of the storage modes using a byte for line switching in an overhead byte of a transmission frame, and the first optical redundant switching apparatus switches the storage modes based on the switching notification.

4. The optical network system according to claim 3, wherein the optical network system includes, as the input signal, at least one of an STM-64 signal, a 10 GbE LAN signal, and a 10 G fiber channel signal.

5. The optical network system according to claim 1, wherein the optical network system includes, as the input signal, at least one of an STM-64 signal, a 10 GbE LAN signal, and a 10 G fiber channel signal.

6. An optical redundant switching apparatus that, in an optical network system including: a first optical redundant switching apparatus that generates standby system signals of M (M is a natural number equal to or larger than N) systems with respect to input signals of N (N is a natural number) systems, converts the input signals and the standby system signals into optical signals having wavelengths different for each of M+N kinds of systems and transmits the optical signals to an optical transmission line; and a second optical redundant switching apparatus that selects signals of the N systems from the optical signals having wavelengths different for each of M+N kinds of systems and outputs the signals, functions as the first redundant switching apparatus during data transmission to the optical transmission line and functions as the second optical redundant switching apparatus during data reception from the optical transmission line, the input signals including at least two kinds of signals in system unit, the optical redundant switching apparatus comprising:

an optical coupler that divides, for each of the systems of the input signals, the input signals into two systems of operating system signals and redundant signals;

an operating system transponder that, during the data transmission to the optical transmission line, converts the operating system signals into optical signals having wavelengths different for each of the systems of the input signals and, during the data reception from the optical transmission line, converts, for each of the systems, the optical signals having the wavelengths converted from the operating system signals among the optical signals having wavelengths different for each of M+N kinds of systems into signals of types corresponding to the input signals;

a transmission-side optical switch that selects signals of M systems from the redundant signals as the standby system signals;

a standby system transponder that, during the data transmission to the optical transmission line, has storage modes for performing kinds of processing respectively corresponding to types of the input signals and converts, in the storage mode corresponding to a type of the standby system signals, the standby system signals into optical signals having wavelengths different from the wavelengths of the optical signals used for the conversion of the operating system signals and different for each of the systems and, during the data reception from the optical transmission line, has storage modes for performing kinds of processing respectively corresponding to the types of the input signals and converts, in the storage mode corresponding to the type of the standby system signals, optical signals having wavelengths converted from the standby system signals among the optical signals having wavelengths different for each of M+N kinds of systems into signals of the type of the standby system signals for each of the systems;

reception-side 2:1 optical switches that are provided for each of the types of the input signals and select an output from the standby system transponder or an output from the operating system transponder and output the output; and a reception-side optical switch that selects, as an output destination of a signal output from the standby system transponder, the reception-side 2:1 optical switch corresponding to a system selected by the transmission-side optical switch and outputs the signal output from the standby system transponder to the selected reception-side 2:1 optical switch, wherein the reception-side 2:1 optical switch corresponding to the system selected by the optical switch selects a signal output from the standby system transponder and outputs the signal, and the other reception-side 2:1 optical switches select a signal output from the operating system transponder and output the signal.

7. The optical redundant switching apparatus according to claim 6, wherein the standby system transponder includes:

an optical transmitter receiver that converts the input signals from optical signals into electric signals;

a serial-to-parallel interconversion circuit that converts a serial electric signal output from the optical transmitter receiver into a parallel electric signal;

a first PLL circuit that generates a first clock for forming a transmission frame;

a framer that generates the transmission frame based on the parallel electric signal and the first clock;

a wavelength-multiplexing optical transmitter receiver that applies parallel-to-serial conversion to the transmission frame output from the framer, converts a signal after the conversion into an optical signal having predetermined wavelength, and transmits the optical signal; and a second PLL circuit that generates a second clock for extracting a signal for each of the systems from the transmission frame, the wavelength-multiplexing optical transmitter receiver converts the optical signals having wavelengths different for each of M+N kinds of systems into an electric signal and subjects the electric signal to serial-to-parallel conversion, the framer extracts, based on the second clock, a signal for each of the systems from a parallel signal converted by the wavelength-multiplexing optical transmitter receiver, the serial-to-parallel interconversion circuit converts the signal extracted by the framer into a serial signal, and the optical transmitter receiver converts the serial signal converted by the serial-to-parallel interconversion circuit into an optical signal and outputs the optical signal.

8. A WDM apparatus that, in an optical network system including: a first WDM apparatus that generates standby system signals of M (M is a natural number equal to or larger than N) systems with respect to input signals of N (N is a natural number) systems, converts the input signals and the standby system signals into optical signals having wavelengths different for each of M+N kinds of systems, and transmits the optical signals to an optical transmission line; and a second WDM apparatus that selects signals of the N systems from the optical signals input from the optical transmission line and outputs the signals, functions as the first WDM apparatus during data transmission to the optical transmission line and functions as the second WDM apparatus during data reception from the optical transmission line, the input signals including at least two kinds of signals in system unit, the WDM apparatus comprising:

an optical coupler that divides, for each of the systems of the input signals, the input signals into two systems of operating system signals and redundant signals;

an operating system transponder that, during the data transmission to the optical transmission line, converts the operating system signals into optical signals having wavelengths different for each of the systems of the input signal and, during the data reception from the optical transmission line, converts, for each of the systems, the optical signals having the wavelengths converted from the operating system signals among the optical signals having wavelengths different for each of M+N kinds of systems into signals of types corresponding to the input signals;

a transmission-side optical switch that selects signals of M systems from the redundant signals as the standby system signals;

a standby system transponder that, during the data transmission to the optical transmission line, has storage modes for performing kinds of processing respectively corresponding to types of the input signals and converts, in the storage mode corresponding to a type of the standby system signals, the standby system signals into optical signals having wavelengths different from the wavelengths of the optical signals used for the conversion of the operating system signals and different for each of the systems and, during the data reception from the optical transmission line, has storage modes for performing kinds of processing respectively corresponding to the types of the input signals and converts, in the storage mode corresponding to the type of the standby system signals, optical signals having wavelengths converted from the standby system signals among the optical signals having wavelengths different for each of M+N kinds of systems into signals of the type of the standby system signals for each of the systems;

reception-side 2:1 optical switches that are provided for each of the types of the input signals and select an output from the standby system transponder or an output from the operating system transponder and output the output; and a reception-side optical switch that selects, as an output destination of a signal output from the standby system transponder, the reception-side 2:1 optical switch corresponding to a system selected by the transmission-side optical switch and outputs the signal output from the standby system transponder to the selected reception-side 2:1 optical switch, wherein the reception-side 2:1 optical switch corresponding to the system selected by the optical switch selects a signal output from the standby system transponder and outputs the signal, and the other reception-side 2:1 optical switches select a signal output from the operating system transponder and output the signal.

* * * * *